US008483093B2

(12) United States Patent
Wang et al.

(10) Patent No.: US 8,483,093 B2
(45) Date of Patent: Jul. 9, 2013

(54) ENERGY EFFICIENT NETWORK FORWARDING BASED ON PERFORMANCE AND ENERGY

(75) Inventors: Ren Wang, Portland, OR (US); Tsung-Yuan Charlie Tai, Portland, OR (US); Jr-Shian James Tsai, Hillsboro, OR (US); Sameh Gobriel, Hillsboro, OR (US); Jong Han Park, Pasadena, CA (US)

(73) Assignee: Intel Corporation, Santa Clara, CA (US)

( * ) Notice: Subject to any disclaimer, the term of this patent is extended or adjusted under 35 U.S.C. 154(b) by 270 days.

(21) Appl. No.: 12/459,344

(22) Filed: Jun. 30, 2009

(65) Prior Publication Data

US 2010/0329276 A1 Dec. 30, 2010

(51) Int. Cl.
*H04L 12/28* (2006.01)
(52) U.S. Cl.
USPC .......................................... 370/255; 370/234
(58) Field of Classification Search
USPC .................................. 370/229–240, 254–258
See application file for complete search history.

(56) References Cited

U.S. PATENT DOCUMENTS

| 6,690,647 | B1 | 2/2004 | Tang et al. | |
|---|---|---|---|---|
| 6,728,265 | B1 | 4/2004 | Yavatkar et al. | |
| 7,500,119 | B2 | 3/2009 | Tsai | |
| 7,633,943 | B2 * | 12/2009 | MeLampy et al. | 370/392 |
| 7,733,808 | B2 * | 6/2010 | Hu et al. | 370/256 |
| 7,881,206 | B2 * | 2/2011 | St. Pierre et al. | 370/238 |
| 2008/0170510 | A1 * | 7/2008 | Singh | 370/254 |
| 2008/0232270 | A1 * | 9/2008 | Fleming et al. | 370/254 |
| 2008/0320492 | A1 | 12/2008 | James et al. | |
| 2009/0077394 | A1 | 3/2009 | Tsai et al. | |
| 2009/0077395 | A1 | 3/2009 | Tsai | |
| 2009/0077396 | A1 | 3/2009 | Tsai et al. | |
| 2009/0077401 | A1 | 3/2009 | Tsai | |
| 2009/0097389 | A1 * | 4/2009 | Diab et al. | 370/201 |
| 2009/0097401 | A1 * | 4/2009 | Diab | 370/230 |
| 2010/0157821 | A1 * | 6/2010 | Morris | 370/252 |
| 2010/0284287 | A1 * | 11/2010 | Venuto | 370/252 |

OTHER PUBLICATIONS

Akkaya, Kemal et al., "A Survey on Routing Protocols for Wireless Sensor Networks", Department of Computer Science and Electrical Engineering, University of Maryland, Baltimore County, 2005, pp. 1-29.
Moy, J., "OSPF Version 2", Network Working Group, RFC 2328, Apr. 1998, pp. 1-244.
Keshav, S. et al., "Issues and Trends in Router Design", IEEE Communications Magazine, May 1998, pp. 144-151.
U.S. Appl. No. 12/238,291, filed Sep. 25, 2008.
U.S. Appl. No. 12/210,016, filed Sep. 12, 2008.

* cited by examiner

*Primary Examiner* — Ayaz Sheikh
*Assistant Examiner* — Mounir Moutaouakil

(57) ABSTRACT

Includes a method that determines utilization of a link and determines a weight for the link based on an energy metric for the determined utilization. The method also includes transmitting the determined weight to at least one node adjacent in the network to the network forwarding device, and determining forwarding based on the transmitted weight.

18 Claims, 5 Drawing Sheets

ENERGY EFFICIENT NETWORK FORWARDING BASED ON PERFORMANCE AND ENERGY

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination.

A given packet may "hop" across many different intermediate network forwarding devices (e.g., "routers", "bridges" and/or "switches") before reaching its destination. These intermediate devices often perform a variety of packet processing operations. For example, intermediate devices often perform packet classification to determine how to forward a packet further toward its destination.

Many different forwarding protocols use link weights to represent the costs of traveling over different links. A device can use these weights to make forwarding path decisions. For example, many protocols use these weights to build a map of a network and figure out the lowest cost path to a destination. A commonly used scheme bases the link weight on the speed of a link. In such a scheme, forwarding decisions typically result in the fastest possible path.

Network forwarding devices are often fully powered around the clock and consume considerable amounts of power. Additionally, these devices frequently require active cooling, adding additional power consumption. Aggregating this consumption over a large number of forwarding devices can impose significant power demands and costs.

DETAILED DESCRIPTION

As described above, network forwarding devices (nodes) often remain fully powered to provide peak performance at all times. However, link utilization is often very low, especially during off-peak hours. This under-utilization represents an opportunity to gain greater energy efficiency. In particular, if traffic can be diverted around a device, the device can then enter a lower power state. This can significantly reduce the total network power consumption, electricity consumed, and cooling costs. This traffic management is enabled by determining a link weight that reflects energy efficiency factors. In addition to providing traffic management to opportunistically populate a network with "sleeping" nodes, a link weight can also take into account performance based considerations that bring nodes back online in response to traffic demands.

Figure 1:
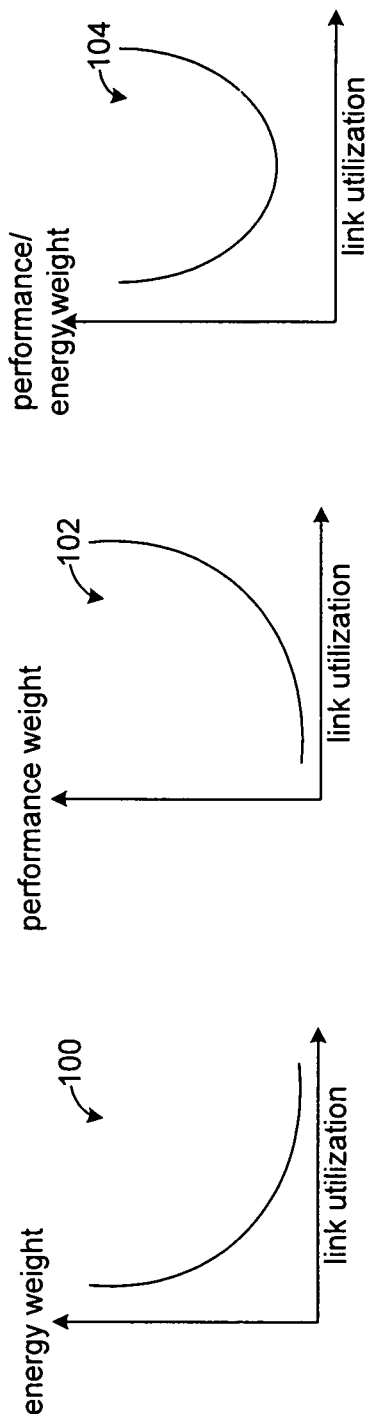
FIG. 1 is a diagram illustrating link weights based on link utilization.

In greater detail, FIG. 1 depicts different weights that reflect energy efficiency 100, forwarding performance 102, and a combination of the two 104 as a function of link utilization. Any of these weights 100, 200, 300 can be used to increase either the energy efficiency of a network, its performance, or both.

FIG. 1 shows a graph 100 of energy weight as a function of link utilization. The link utilization may be a measure, for example, of bytes or packets carried by the link over some set period of time. As shown, as link utilization increases, the energy consumed by a forwarding device is amortized over a greater amount of traffic, bringing the energy weight down. Using this weight 100 in a network can concentrate network traffic into a smaller set of more fully utilized nodes.

FIG. 1 also depicts a graph 102 of a performance weight as a function of link utilization. The performance measured may reflect, for example, the average amount of time a received packet waits before being forwarded or the number of packets dropped by the device. As shown, higher utilization often results in performance degradation, for example, as queues backup and so forth. Using this weight 102 in a network can result in an increase in performance as traffic is distributed among a greater number of devices to reduce the traffic burden of a node.

Finally, graph 104 depicts a combination of the energy 100 and performance 102 weights into a single weight 104. As shown, with the aggregated weight 104, under-utilization may result in a higher weight due to the energy inefficiency of a forwarding device handling a very small load. Likewise, over-utilization may result in a higher weight due to performance degradation. In other words, the weight 104 serves to increase the energy efficiency of the network while reducing the impact on overall network performance.

The weights 100, 102, 104 shown in FIG. 1, however, are merely examples and the shape of each function may vary considerably between devices. Additionally, how the measures are determined may vary from those described above. Further, weight 104 may not be a simple aggregation of weights 100, 102, but may be formed from differently weighted combinations 100, 102 based on policies that can change the balancing of performance and energy usage. For example, if overall energy consumption is deemed more important than performance, a policy can place a greater weight on the energy weight 100 than the performance weight 102 when calculating the final performance/energy weight 104, and vice-versa. Finally, the performance/energy weight 104 may be combined with other metrics such as link speed to determine an overall link weight.

Figure 2:
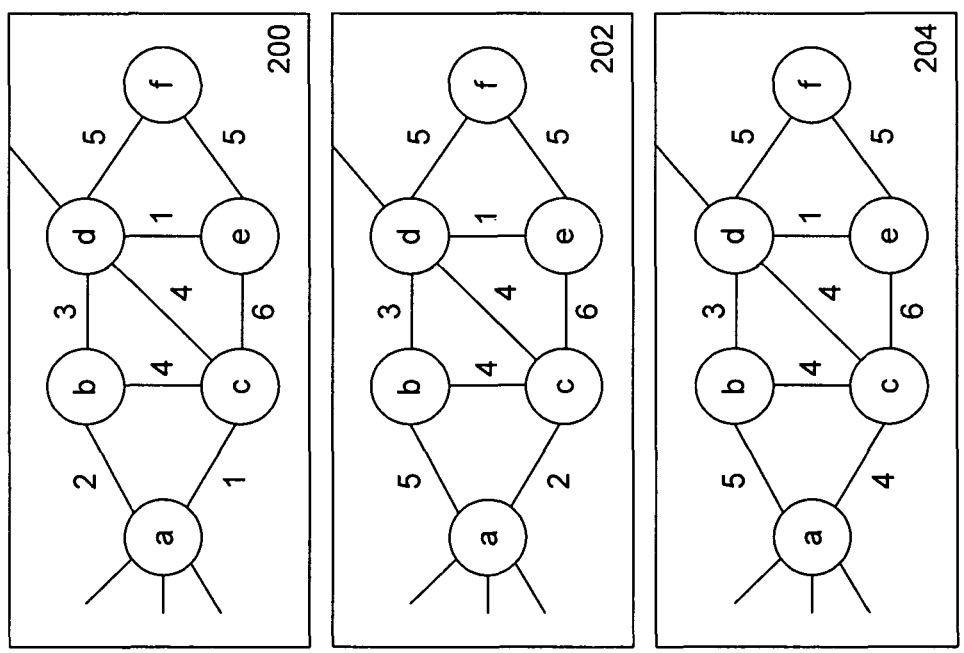
FIG. 2 is a diagram illustrating network operation.

FIG. 2 illustrates network operation that results from the link weighting described above. While any of weights 100, 102, 104 can be used, FIG. 2 illustrates the use of a performance/energy weight 106. As shown, a network includes nodes a-f interconnected by links. The weights of the links can be determined in a distributed fashion. That is, each node can independently determine the weight associated with a given link and propagate this information throughout the network using the mechanism a given forwarding protocol provides.

As shown in network diagram 200, based on the link weights, a path from node "a" to node "d" via node "b" will have an associated traversal cost of 5 (i.e., 2 for a-b+3 for b-d). Similarly, a path from node "a" to node "d" via node "c" will also have a traversal cost of 5 (i.e., 1 for a-c+4 for c-d). Other paths (e.g., a-c-e-d or a-c-e-f-d have costs greater than 5. Given the equal cost of paths a-b-d and a-c-d, packets may traverse either path with equal probability.

Assuming node "b" consumes more power than node "c" for equal workloads, the weight for the link between nodes "a" and "b" will increase relative to the weight for the link between nodes "a" and "c". That is, as shown in network diagram 202, the link weight for a-c will be rise (e.g., 5) above the link weight for a-b (e.g., 2). Thus, a-c-d now offers a lowest cost path from a to d. As traffic is steered over path a-c-d instead of a-b-d, utilization falls for node "b". This in turn, can cause the weight of link a-b to further increase due to the increase in the energy efficiency weighting. Over time, due to the increasing weight, traffic may completely bypass node "b", leaving it idle. Node "b" can then go into a power saving state, reducing overall network power consumption. A power saving state may include powering down or reducing the clock provided to network components (e.g., PHYs or network interfaces) and/or may include powering down other components such as a processor or other platform resources. The depth of a power down may vary according to policy. For example, a device may enter a progressively deeper sleep over time.

As shown in diagram 204, when the network becomes more heavily loaded (e.g., during peak hours), node "c" experiences high utilization, thus increasing the performance/energy weight associated with link a-c (e.g., 4) due to the performance degradation of "c". This in turn generates a higher weight for route a-c-d again equals that of path a-b-c. At this point, node "b" can exit from a low power saving state, alleviating the workload of node "c", permitting node "c" to increase performance.

Thus, as shown in FIG. 2, the performance/energy weighting steers traffic through more energy-efficient forwarding devices (e.g., those that consume relatively less power for a given workload) and permits comparatively power-hungry nodes to go into power saving states. The weighting also works to bring more nodes online during high-traffic periods. While the technique may increase the power consumed by any one node, the link weighting will decrease overall network power consumption.

Since the link weights can be independently computed by the different devices, devices implementing techniques described above can be gradually deployed within a domain without completely overhauling an existing protocol. That is, node "b" may use the weighting described above while other nodes use their previous weighting scheme. Assuming the performance/energy weight range is commensurate with the range of weights reported by other devices, a given protocol can operate as is, without alteration.

Figure 3:
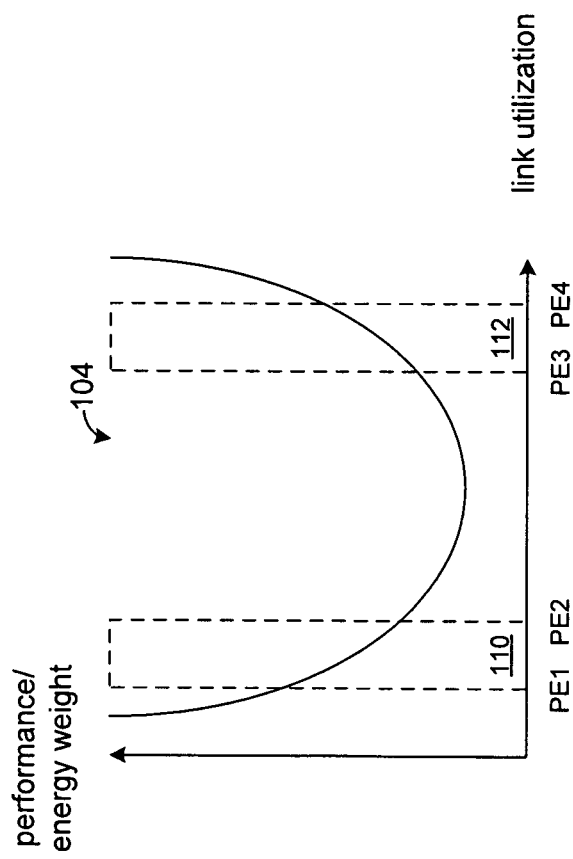
FIG. 3 is a diagram illustrating link weight guard bands.

The process that unfolds when a link weight changes can consume both network bandwidth and processor cycles as the change propagates through the network and forwarding information is updated. To prevent oscillation between different weights, guard bands can be applied. For example, FIG. 3 depicts guard bands 110, 112 that cover ranges of link utilization. When a link weight remains within a guard band, a change in link weight is not reported to other network nodes. Again, this prevents a link weight change from propagating through the network only to change back soon after.

For example, when a link's performance/energy weight is high due to very low utilization, a guard band 110 may be formed by a link weight that will cause traffic to be diverted away from the device (PE1) and a link weight that will cause traffic to be diverted toward the device (PE2). While a link weight moves within guard band 110, changes in link weight are not propagated to other network nodes. These band limits can be computed based on analysis of the current network link weight model maintained by a device.

FIG. 3 depicts a second guard band 112 that applies when the performance/energy weight is high due to very high utilization. In this case, PE3 represents the threshold for the packets to be diverted to the device and PE4 represents the threshold for the packets to be diverted away from the P device.

Other techniques can be used to reduce link weight "thrash". For example, a link weight may be determined based on an extended period of time or may be based on an average link weight over the time period instead of an ending value. Additionally, computation of the guard bands may be handled in different ways. For example, the guard bands can be updated when the device receives an indication that a link weight in the network has changed. Alternately, the guard bands can be recomputed when a path through the network is changed due to a change in weight.

Figure 4:
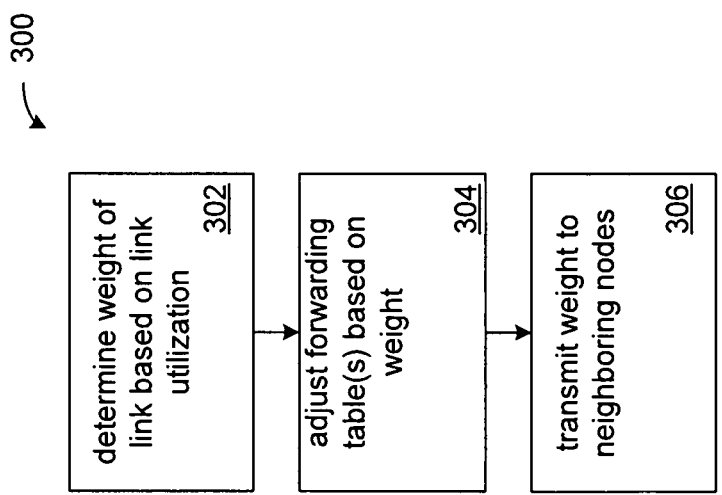
FIG. 4 is a flow chart illustrating use of a link weight.

FIG. 4 depicts sample operation 300 of a forwarding device implementing techniques described above. As shown, the forwarding device can determine a weight (e.g., 100, 102, 104) based on detected link utilization. For example, a device vendor can pre-determine and pre-populate a lookup table that associates link weights with link utilization. For example, a table may specify a utilization range and an average (or maximum or minimum, etc.) of a weight function over the specified range. Power consumption corresponding to certain utilization can vary based on traffic pattern; thus, the lookup table can be calibrated based on a typical usage model for the system.

As shown, based on this weight, the device can update 304 its own network graph and potentially alter a forwarding table based on this change. For example, the device may change the next hop associated with a given IP destination address. The device can also transmit 306 the determined weight to other network nodes. For example, in an Open Short Path First (OSPF) protocol commonly used in Internet Protocol networks, transmitting this weight often involves flooding a network with a link state advertisement including the weight. The receiving network nodes can in turn update their forwarding tables if necessary.

The scheme illustrated above can be used in a variety of forwarding protocols including Open Short Path First (OSPF) and distance vector protocols. These protocols can include gateway routing protocols (e.g., Interior Gateway Routing Protocol (IGRP) and Enhanced Interior Gateway Routing Protocol (EIGRP)) and others such as Routing Information Protocol (RIP) or Intermediate System to Intermediate System (IS-IS) protocols. Additionally, the techniques described above can be applied at different levels in a protocol stack including Ethernet switching, Asynchronous Transfer Mode (ATM) switching, and higher level protocols. The techniques may also be used in different network environments such as the Internet, an enterprise network, or a mesh network such as a wireless mesh with plugged in Access Point (AP).

Figure 5:
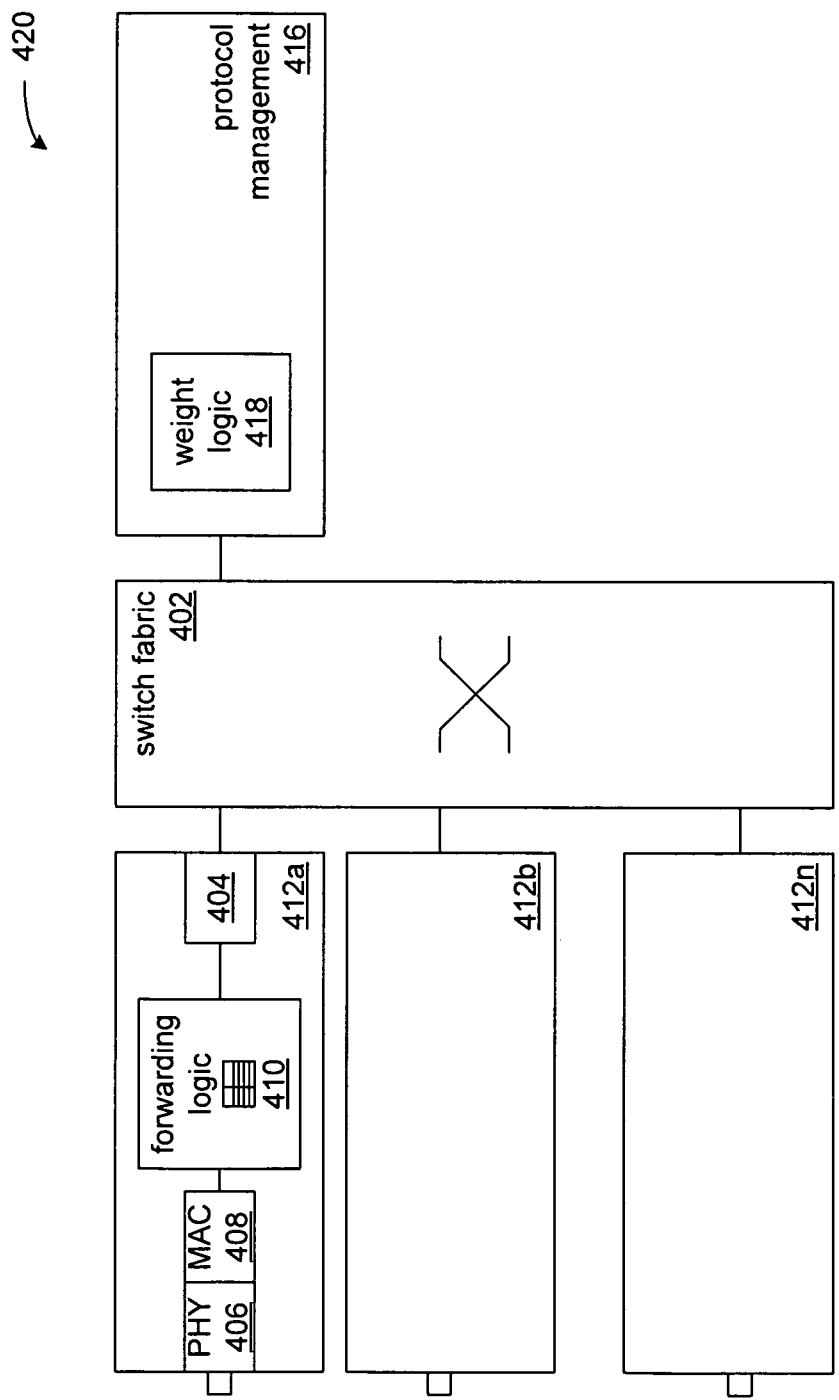
FIG. 5 is a diagram of a forwarding device.

Additionally, a wide variety of devices can implement techniques described above. For example, FIG. 5 depicts a router architecture 420 that interconnects a collection of blades 412a-412n by a switch fabric. Individual blades 412a may include one or more physical layer (PHY) devices 406 (e.g., optic, wire, and wireless PHYs) that handle communication over network connections. The PHYs translate between the physical signals carried by different network mediums and the bits (e.g., "0"-s and "1"-s) used by digital systems. The line cards 412 may also include "level 2" components such as Ethernet media access controllers (MAC) 408, Synchronous Optic Network (SONET), High-Level Data Link (HDLC) framers, and so forth. These components 408 can perform operations on frames such as error detection and/or correction. The blades 412a shown may also include forwarding logic 410 to perform packet processing operations to direct received packets, via the switch fabric 402, to a blade 412x providing an egress interface to forward the packet. For example, the logic may be implemented as hard wired circuitry or may be implemented by a programmed processor such as a network processor. Such logic 410 may use a lookup into a forwarding table to make a forwarding determination.

As shown, the router 420 includes a protocol management blade 416 that includes logic 418 to implement techniques described above. This logic 418 may monitor utilization of each link provided by the blades and determine an associated performance/energy weight. For example, the logic 418 may request network statistics for each network interface. The protocol management blade 416 may also update forwarding tables used by the routing blades 412x and coordinate transmission of the determined weights to other nodes.

While FIG. 4 depicts a specific example of a router, the techniques may be implemented in network devices having designs other than those shown. For example, some routers or switches do not feature a blade/chassis architecture. Additionally, control plane operation need not be located in a separate management blade.

The term circuitry as used herein includes hardwired circuitry, digital circuitry, analog circuitry, programmable circuitry, and so forth. The programmable circuitry may operate on computer programs disposed on a computer readable storage medium that implement techniques described above. The term packet as used herein encompasses frames (e.g., Ethernet frames), segments (e.g., TCP segments), Internet Protocol datagrams (e.g., IPv4 and IPv6) and other protocol data units (PDUs) used in networks.

Other embodiments are within the scope of the following claims.

What is claimed is:

1. A method comprising:
   at a network forwarding device:
      determining an energy weight for a link to a remote network device;
      determining a performance weight for the link;
      determining a single weight based, at least in part, on the determined energy weight and the determined performance weight;
      determining if the single weight falls within a range of weight values spanning multiple different weight values;
      if the single weight falls within the range of weight values spanning multiple different weight values; not transmitting, at least, the determined single weight to at least one node adjacent in the network to the network forwarding device; and
      if the single weight does not fall within the range of weight values spanning multiple different weight values, before transmitting the determined single weight, determining whether the single weight would change a set of paths through the network selected by path selection of a forwarding protocol.

2. The method of claim 1,
   wherein the performance weight comprises a weight based at least in part on: (1) an average forwarding delay value or (2) a number of dropped packets.

3. The method of claim 1,
   further comprising entering a power reduction mode based on network traffic received by the network forwarding device.

4. The method of claim 1, further comprising:
   determining the range of weight values spanning multiple different weight values.

5. The method of claim 4, further comprising:
   determining weight values that would change the set of paths through the network including the device, if propagated, in accordance with path selection of a forwarding protocol; and
   wherein the range of weight values comprises a range based, at least in part, on the determined weight values.

6. The method of claim 1,
   wherein the determining the single weight comprises a weighted additive aggregation to adjust the contribution of the energy weight and the performance weight to the single weight.

7. The method of claim 1, further comprising:
   determining if the single weight falls within a second range of weight values spanning multiple different weight values, the second range being different than the first range;
   if the single weight falls within the second range of weight values spanning multiple different weight values; not transmitting, at least, the determined single weight to at least one node adjacent in the network to the network forwarding device.

8. The method of claim 7, further comprising:
   transmitting the determined single weight to at least one node adjacent in the network to the network forwarding device if the determined single weight is not in the range of weight values spanning multiple different weight value and if the determined single weight is not in the second range of weight values.

9. The method of claim 1, further comprising:
   transmitting the determined single weight to at least one node adjacent in the network to the network forwarding device if the determined single weight is not in the range of weight values spanning multiple different weight values.

10. A computer program product disposed on a non-transitory computer readable storage medium comprising instructions for causing a processor of a network forwarding device to:
   determine an energy weight for a link to a remote network device;
   determine a performance weight for the link;
   determine a single weight based, at least in part, on the determined energy weight and the determined performance weight;
   determine if the single weight falls within a range of weight values spanning multiple different weight values;
   if the single weight falls within the range of weight values spanning multiple different weight values; not transmit, at least, the determined single weight to at least one node adjacent in the network to the network forwarding device; and
   if the single weight does not fall within the range of weight values spanning multiple different weight values, before transmit of the determined single weight, determine whether the single weight would change a set of paths through the network selected by path selection of a forwarding protocol.

11. The computer program of claim 10,
   further comprising instructions that cause the processor to enter a power reduction mode based on network traffic received by the network forwarding device.

12. The computer program of claim 10, further comprising instructions for causing the processor to:
   determine the range of weight values spanning multiple different weight values.

13. The computer program of claim 12, further comprising instructions for causing the processor to:
- determining weight values that would change in the set of paths through the network including the device, if propagated, in accordance with path selection of a forwarding protocol; and
- wherein the range of weight values comprises a range based, at least in part, on the determined weight values.

14. A system comprising:
- a set of line cards;
- a switch fabric interconnecting the line cards; and
- circuitry to
  - determine an energy weight for a link to a remote network device;
  - determine a performance weight for the link;
  - determine a single weight based, at least in part, on the determined energy weight and the determined performance weight;
  - determine if the single weight falls within a range of weight values spanning multiple different weight values;
  - if the single weight falls within the range of weight values spanning multiple different weight values; not transmit, at least, the determined single weight to at least one node adjacent in the network to the network forwarding device; and
  - if the single weight does not fall within the range of weight values spanning multiple different weight values, before transmit of the determined single weight, determine whether the single weight would change the set of paths through the network selected by path selection of a forwarding protocol.

15. The system of claim 14,
- further comprising circuitry to enter a power reduction mode based on network traffic received by the network forwarding device.

16. The system of claim 14, further comprising circuitry to:
- determine the range of weight values spanning multiple different weight.

17. The system of claim 16, further comprising circuitry to:
- determine weight values that would change the set of paths through the network including the device, if propagated, in accordance with path selection of a forwarding protocol; and
- wherein the at least one range of weight values comprises a range based, at least in part, on the determined weight values.

18. Instructions disposed on a non-transitory computer readable storage medium for causing a processor of a network forwarding device to:
- determine a single link weight based at least in part on an energy metric associated with a link to a remote network device, the energy metric being different than a previously determined energy metric of the link to the remote network device;
- if the link weight does not fall within a range of weight values spanning multiple different weight values, determine whether the single weight would change the set of paths through the network selected by path selection of a forwarding protocol; and
- determine whether to flood a network with the link weight based at least in part on the determine whether the single link weight would change the set of paths through the network selected by path selection of the forwarding protocol.

* * * * *